Feb. 9, 1971  A. ORIANI  3,561,250
APPARATUS FOR PRESSING METAL SHEATHS ON THE ENDS
OF OIL-FILLED ELECTRIC CABLES
Filed April 5, 1968  3 Sheets-Sheet 3

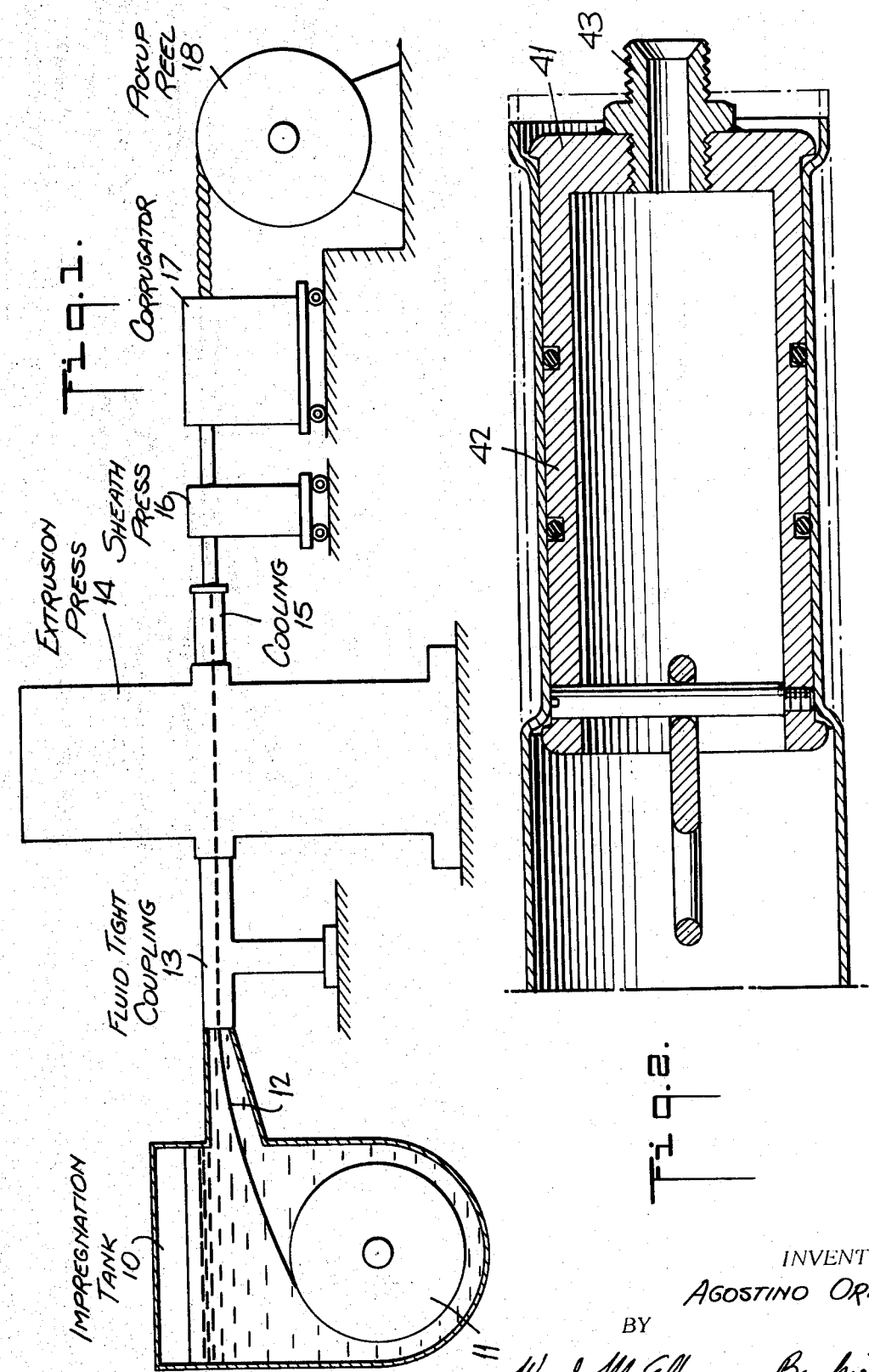

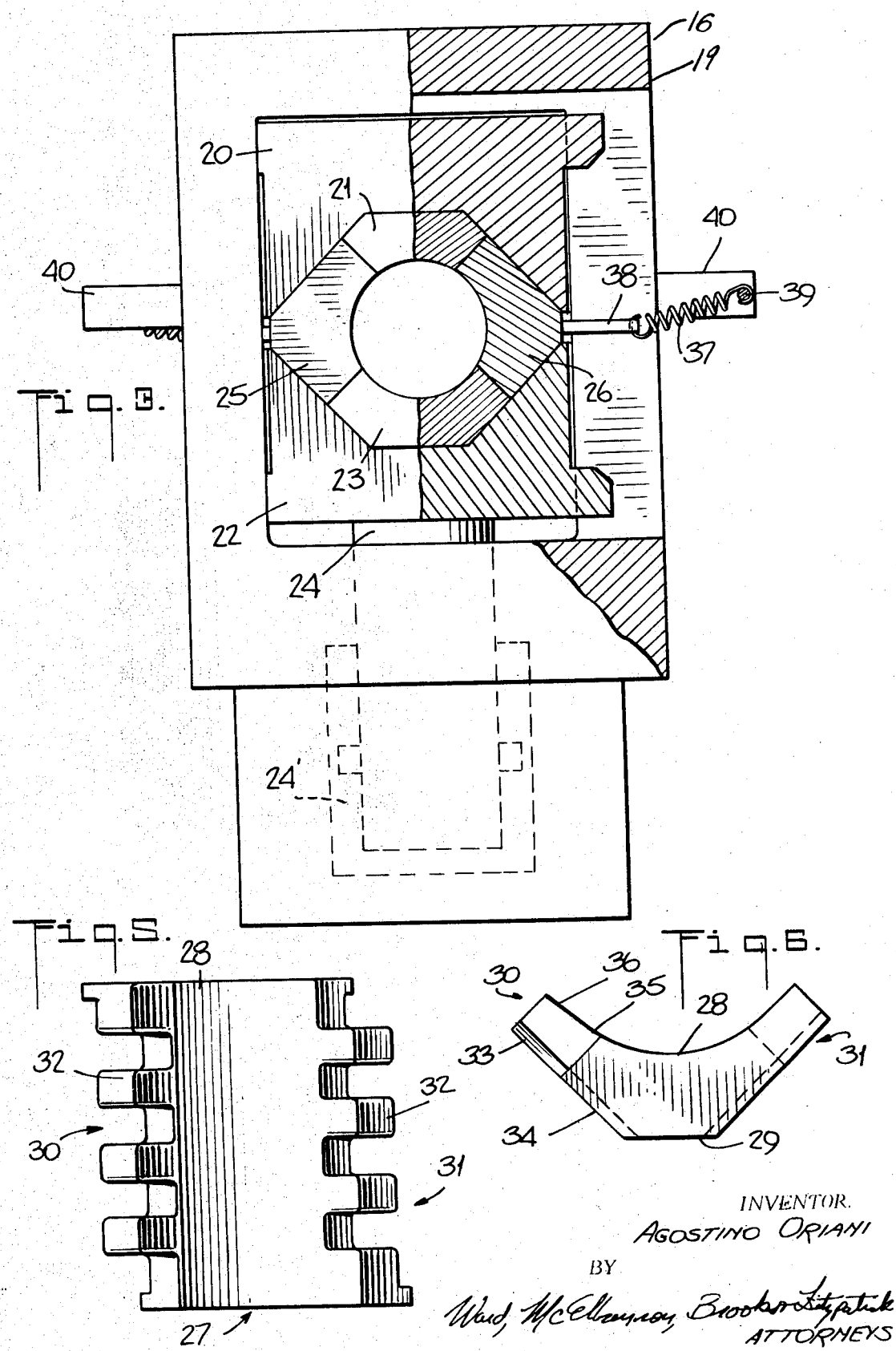

INVENTOR.
AGOSTINO ORIANI
BY
Ward, McElhenny, Brooks Fitzpatrick
ATTORNEYS

United States Patent Office 3,561,250
Patented Feb. 9, 1971

3,561,250
APPARATUS FOR PRESSING METAL SHEATHS ON THE ENDS OF OIL-FILLED ELECTRIC CABLES
Agostino Oriani, Milan, Italy, assignor to Pirelli Societa per Azioni, Milan, Italy, a corporation of Italy
Filed Apr. 5, 1968, Ser. No. 719,104
Claims priority, application Italy, May 23, 1967, 16,391/67
Int. Cl. B21d 41/04
U.S. Cl. 72—402                                5 Claims

ABSTRACT OF THE DISCLOSURE

An apparatus for sealing the ends of oil-filled electric cable having a metallic sheath the prevent leakage during manufacturing process and including means for pressing the metallic sheath to a rigid closure member positioned at the cable end.

---

The present invention relates to an apparatus for sealing the ends of oil-filled electric cable having an extruded metallic sheath, and, in particular, to an apparatus for pressing the metallic sheath to a rigid closure member positioned at the cable end.

As those skilled in the art appreciate, an oil-filled electric cable includes a core defined by an electrical conductor surrounded by stratified insulation impregnated with fluid oil, and an outer metallic sheath, usually made of lead or aluminum. The sheath maintains the core under predetermined environmental conditions and thus prevents alteration in the dielectric characteristics of the stratified insulation. The sheath maintains the core in these predetermined environmental conditions by preventing oil leakage from the core as well as by protecting the core against any possible moisture penetration from its surroundings.

Of late, great interest has been directed to oil-filled cable of the character described which utilizes an extruded aluminum sheath since this construction permits the production of a lighter electric cable and since such construction has shown improved resistance to various types of mechanical stress as compared to other types of construction heretofore known. It has been found, however, that oil-filled electric cable having extruded aluminum sheath tends to be more rigid or inflexible than some other types and thus is not suitable for use in many electrical installations.

This problem has been solved, however, particularly in electric cables having a large diameter, by corrugating the aluminum metallic sheath after the electric cable has passed through the aluminum extruding press. It will be appreciated from this stated solution that, in order to properly corrugate it, the extruded aluminum sheath must have a diameter considerably greater than that of the cable core. This latter requirement, however, complicates the manufacture of aluminum sheathed cable.

During the manufacture of oil-filled cable, the cable core is unreeled from drums disposed within a pressurized tank containing the impregnating oil and then passed through a fluid tight connection to the aluminum extruding press. Consequently, since the core of the electric cable within the tank is always immersed in the oil, and since the oil in the tank is maintained under substantial pressure with respect to the output of the extruding press, a substantial oil leak would take place at the output of the extruding press through the gap between the cable core and its extruded sheath. If this leak was left unattended, the quantity of oil flowing from this leak would be substantial. The leak would, as a result, destroy the oil pressure and would allow air to penetrate to the electric cable core and damage its insulation. In order to avoid the damages consequent to this, it is necessary to tightly seal the electric cable ends by pressing the aluminum sheath against a rigid closing element.

The present invention is directed to an apparatus for pressing the extruded metallic sheath of an oil-filled electric cable on a rigid closing element in order to prevent oil leaks and consequent air penetration into the insulation of the cable core.

In accordance with an aspect of the present invention, there is provided an apparatus for sealing the ends of oil-filled electric cable having a metallic sheath by pressing the metallic sheath to a rigid closure member at the ends of the cable. The apparatus preferably includes a frame, at least two support members mounted on the frame for predetermined relative movement between selected positions, and at last one set of two clamping jaws associated with the support members and having mutually facing surfaces adapted for relative movement between expanded and contracted positions in response to the relative movement between the support members. The two clamping jaws, including their mutually facing surfaces, define interleaving radial sidewall portions of a substantially cylindrical element for pressing the metallic sheath. These radial sidewall portions are maintained in interleaving engagement by toothed elements provided in the clamping jaws and are adapted to maintain at least partial interleaving engagement when the clamping jaws are in their expanded position. Means are also provided for controlling the relative movement of the supporting members and of the clamping jaws.

In accordance with another aspect of the present invention, one of the support members is rigidly secured to the frame and supports one clamping jaw of the mentioned one set, and the second support member is actuated by means for controlling its relative movement with respect to the other support member. Additionally, the mentioned interleaving radial sidewall portions of the cylindrical element which press the cable sheath, are further defined by an additional set of clamping jaws which are constructed substantially similar to the first mentioned set. The clamping jaws of this additional set also have inclined sliding surfaces which are coupled to correspondingly shaped sliding surfaces provided on the two support members. The clamping jaws of this additional set are adapted for movement between expanded and contracted positions in synchronism with the movement of the clamping jaws of the first set and also in response to the relative movement of the supporting members. Means are also provided for controlling the relative movement of the clamping jaws of the additional set.

In accordance with still another aspect of the present invention, the toothed elements of all the mentioned clamping jaws are constructed as lateral extensions of the mutually facing surfaces of the clamping jaws. The toothed elements are also curved for a length equal to substantially one half of their lateral development to define lateral extensions of said radial sidewall portions of the cylindrical element. They are substantially straight for the remaining length so as to prevent the pinching of the aluminum sheath when the clamping jaws move to the contracted position.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying the several purposes of the invention. It is important, therefore, that the claims be regarded as including such equivalent constructions as do not depart from the spirit and scope of the invention.

A specific embodiment of the invention has been chosen for purposes of illustration and description, and is shown in the accompanying drawings forming a part of the specification, wherein:

FIG. 1 is a schematic diagram of plant for producing oil-filled electric cable having an aluminum sheath, and which utilizes a sealing apparatus embodying the present invention;

FIG. 2 is a sectional view of an end of an oil-filled electric cable provided with a rigid element to which the aluminum sheath is pressed by a sealing apparatus embodying the present invention;

FIG. 3 is a front view, partially in section of a sealing apparatus embodying the present invention and showing a lateral clamping jaws expanding means;

FIG. 5 is a top view of a clamping jaw utilized in the apparatus shown in FIG. 3; and FIG. 6 is a front view of the clamping jaw shown in FIG. 5.

Figure 4B:
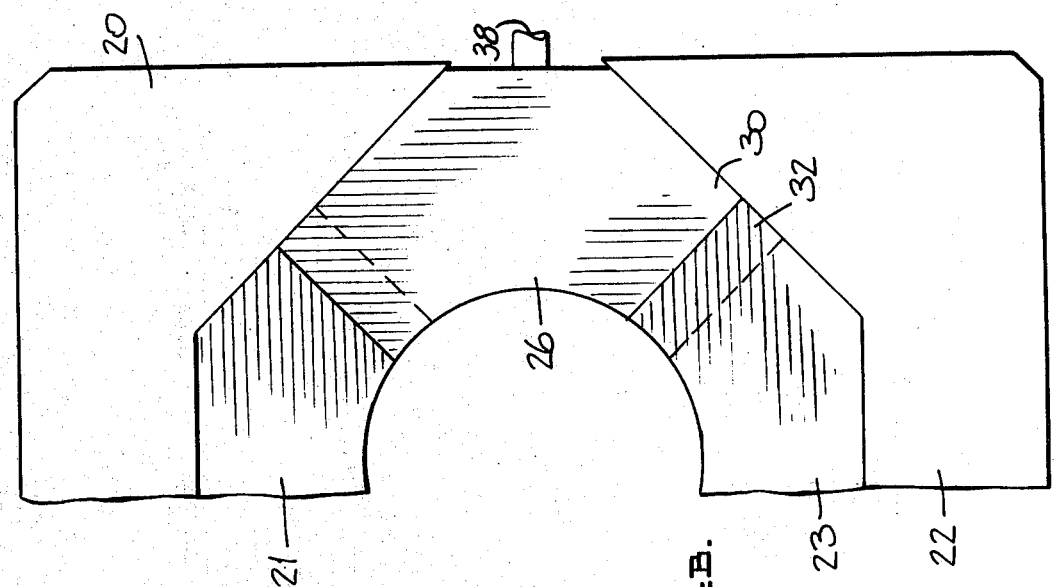
FIG. 4b is an enlarged fragmentary view similar to FIG. 4a, and illustrating positional relationships between support members and clamping jaws when in a contracted position.

Referring now to the drawings in detail and, more particularly, to FIG. 1, there is shown in schematic form a plant for the manufacture of oil-filled electric cable having an extruded aluminum sheath and utilizing the present invention. This plant includes an impregnation tank 10 which contains a drum 11 having wound thereon an electric cable core 12 comprising an electrical conductor surrounded by stratified insulation. The impregnation tank 10 is filled with insulating oil. The cable core 12 is selectively unwound from the drum 11 and is passed through a fluid tight coupling means 13 to an aluminum extruding press 14. The aluminum extruding press 14 provides the cable core 12 with an aluminum sheath in a well known manner. The composite cable, thus formed with the aluminum sheath, is then passed through a cooling conduit 15 to an apparatus 16 for sealing the ends thereof and which embodies the present invention. Subsequently, the electric cable is processed by means 17 which corrugates the sheath of the electric cable and then the electric cable is wound on the drum 18.

All of the above-mentioned elements and means are well known in the art, and commonly utilized in the manufacture of oil-filled electric cable, except, of course, for the apparatus 16 which embodies one form of the present invention.

As shown in FIG. 3, the apparatus 16 for pressing the sheath at the ends of the electric cable to seal the same, includes a frame 19 and a first support member 20 mounted in the upper portion of the frame. An upper toothed clamping jaw 21 is securely fixed to the first support member 20 as shown. A second support member 22 is provided in the lower portion of the frame and is adapted for movement in the vertical direction relative to the first support member 20. A lower toothed clamping jaw 23, facing the upper clamping jaw 21 in the manner shown in FIG. 3, is securely fixed to the second support member 22. The second support meember 22 is connected to a fluid driven piston 24 which is housed in a fluid cylinder 24′ and which is thereby adapted to move the second support member 22 in the vertical direction. Finally, two lateral toothed clamping jaws 25 and 26 are provided opposite from each other and between the clamping jaws 21 and 23 with their toothed positions interleaving as shown in FIG. 3. The clamping jaws 25 and 26 are constructed substantially the same as the clamping jaws 21 and 23.

As shown in FIGS. 5 and 6, each of the clamping jaws 21, 23, 25 and 26 includes a central solid portion 27 having an inner cylindrical smooth surface 28, and an outer polyhedral surface 29. The clamping jaws also include two lateral portions 30 and 31, each having prismatic teeth 32 which constitute continuous extensions of the central solid portion 27. Each of the teeth 32 has an outer surface or sidewall 33 which lies on a corresponding plane 34 of the polyhedral surface 29 of the central solid portion 27. Each of the teeth 32 also has an inner surface or sidewall which is curved for a length 35 equal to about one half of its development so as to form an extension of the cylindrical surface 28. The other half of their development is straight for a length 36 which is provided tangential to the curved length 35. The above described composite profile of the inner sidewall of each tooth 32 prevents the pinching of the sheath when the clamping jaws are closed and their teeth interleave.

Figure 4A:
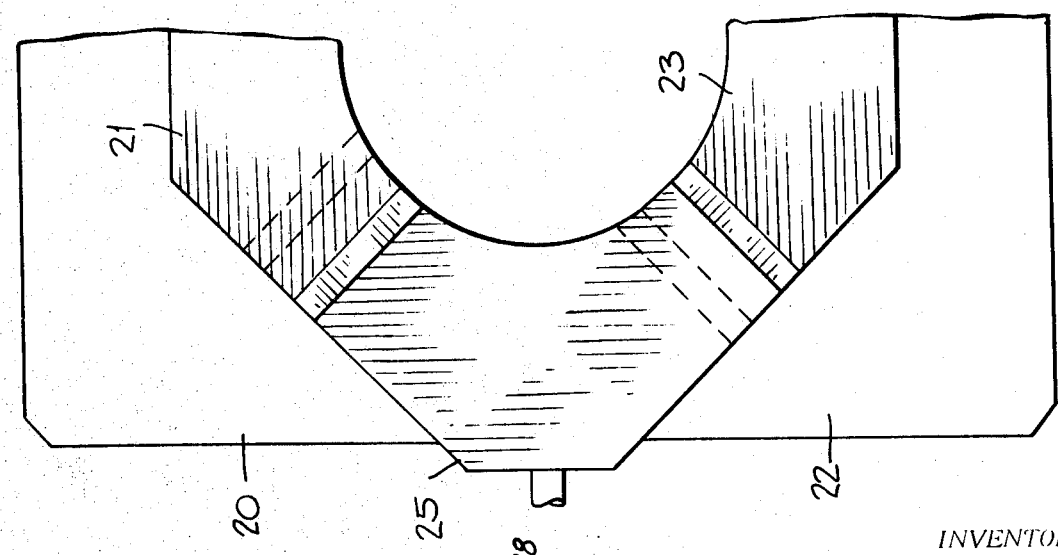
FIG. 4a is an enlarged fragmentary view of a portion of the apparatus shown in FIG. 3, and illustrating positional relationships between support members and clamping jaws when in an expanded position.

As shown in detail in FIG. 5, the teeth 32 of the lateral portion 30 of each clamping jaw are offset with respect to the teeth 32 of the lateral portion 31. This offset is necessary since, as mentioned above, all the clamping jaws have the same structural configuration and are interleaved with one another. Thus, as shown in FIG. 4b, the teeth 32 on the lateral portion 31 of the clamping jaw 23 interleave with the teeth 32 on the lateral portion 30 of the clamping jaw 26. In turn, the teeth 32 on the lateral portion 31 of the clamping jaw 26 interleave with the teeth 32 on the lateral portion 30 of the clamping jaw 21. As shown in FIG. 4a, clamping jaw 25 interleaves with the teeth 32 on the lateral portions of the clamping jaws 21 and 23 in substantially the same manner as described in connection with clamping jaw 26.

As shown in FIG. 4a, the teeth 32 of the clamping jaws are developed to a length which permits the clamping jaws 21, 23, 25 and 26 to remain in partial interleaved engagement even when the clamping jaws assume a mutually expanded position as will be more fully explained hereinafter. This feature of the present invention permits a better and faster use of the apparatus since no preliminary assembly operation is necessary before its use.

The overall structural configuration of the clamping jaws described above is very advantageous since it permits the clamping jaws 21, 23, 25 and 26 to be interchanged even though clamping jaws 21 and 23 operate in a manner different from that of clamping jaws 25 and 26. Referring to FIGS. 3, 4a, and 4b, it will be noted that clamping jaws 25 and 26 are not rigidly secured to either of the support members 20 or 22 but rather are adapted to slide on their polyhedral surfaces 29 against the inclined planes presented by the mutually facing surfaces of support members 20 and 22.

Each of the lateral clamping jaws 25 and 26 is provided with means for controlling the extent to which it may slide on the inclined planes provided by the support members 20 and 22. To this end, a tension spring 37 is secured at its ends, respectively, to a pin 38 integrally formed in each of the clamping jaws 25 and 26 and to a pin 39 formed in the arm 40 attached to the frame 19.

The above-described pressing apparatus 16 is utilized as follows. The apparatus 16 is positioned near the output of the aluminum extruding press 14; and the clamping jaws 21, 23, 25 and 26 are raised to their opened or expanded position as shown in FIG. 4a. To this end, the piston 24 is fluid operated in its cylinder 24′ to lower the support member 22 and consequently the lower clamping jaw 23 fixed thereto. This movement of the support member 22 causes relative expansion between the clamping jaws 21 and 23. As shown in FIGS. 3, 4a and 4b, the movement of the support member 22 in the downward direction additionally permits the lateral clamping jaws 25 and 26 to slide upwardly under the influence of the tension springs 41 and on their polyhedral surface 29 against the inclined planes provided by the support members 20 and 22. Thus, the movement of the support member 22 causes outward relative movement between all the clamping jaws while still maintaining partial interleaved engagement between one another.

After the apparatus 16 is positioned near the aluminum extruding press 14, the aluminum extruding press is then started and operated in its conventional manner. The sheated electric cable produced by the extruding press 14 is then passed through the expanded clamping jaws of the apparatus 16. As shown in FIG. 2, the end of the electric cable is then positioned between the clamping jaws of the clamping device 16 and an end flanged metal closing element 41 having a central sleeve portion 42 is inserted into the cable sheath. This insertion may be easily carried out by utilizing a tie-rod (not shown) of predetermined length which is threaded to a connector 43 at one end of the element 41 and which facilitates cable handling and positioning.

Once the electric cable is positioned between the clamping jaws of the clamping device 16, the piston 24 is actuated to raise the support member 22 and consequently the lower clamping jaw 23. The movement of the support member 22 additionally subjects the lateral clamping jaws 25 and 26 to centripetal displacement by reason of the inward force exerted on the polyhedral surface 29 of the clamping jaws 25 and 26 by the inclined planes of the support member 22. As shown in FIG. 4b, the upward movement of the piston 24 causes the teeth of the clamping jaws to become completely engaged with one another, and thus forms a substantially hollow cylindrically shaped element which presses the aluminum sheath against the sleeve 42 of the closing element 41. As shown in FIG. 2, the aluminum sheath is thus squeezed against the sleeve of the closing element until the end of the electric cable is tightly sealed.

The above described operation of the clamping device may be carried out without interrupting the operation of the aluminum extruding press. This may be accomplished because the operation of the clamping device may be carried out relatively fast and because the feed rate of electric cable from the extruding press is relatively slow.

At the end of the clamping operation, the clamping jaws 21, 23, 25 and 26 are again brought to their expanded positions and the clamping device 16 is removed from the electric cable production line in order to facilitate other manufacturing processes. In this regard, the upper support member 20 is made removable from the frame 19, thus permitting the removal of the upper clamping jaw 21. When the upper support 20 is removed, the electric cable can be removed from the vicinity of the remaining clamping jaws 23, 25, and 26, respectively, and the remaining portion of the clamping device 16 is removed from the production area until the other end of the electric cable is ready to be sealed.

If the particular operation conditions require, the clamping device 16 may be modified by simple mechanical expedients in order to make the device rotatable. For this purpose, the frame 19 may be rotatably mounted on its base and may be provided with a pin or an analogous stop element to adjust the frame to any desired angle.

It may be seen from the above that there is disclosed an apparatus from sealing ends of oil-filled electric cable which utilizes a plurality of clamping jaws forming a cylindrically shaped pressing element, which is easily operated and which does not pinch or otherwise damage the sheath of the electric cable during use.

Having thus described the invention with particular reference to the preferred form thereof, it will be obvious to those skilled in the art to which the invention pertains, after understanding the invention, that various changes and modifications may be made therein without departing from the spirit and scope of the invention, as defined by the claims appended thereto.

What is claimed as new and desired to be secured by Letters Patent is:

1. Apparatus for sealing the ends of oil-filled electric cables having a metallic sheath by pressing the metallic sheath at the end of the cable to a rigid closure member, said apparatus comprising a frame, at least two support members mounted on said frame, one of said support members being rigidly secured to said frame and the other of said support members being movably mounted on said frame for predetermined movement between selected positions, a first set of two clamping jaws and a second set of two clamping jaws constructed substantially similar to said first set of clamping jaws associated with said support members and having mutually facing surfaces adapted for relative movement between expanded and contracted positions in response to the said movement of said other support member, said clamping jaws, including said mutually facing surfaces, defining interleaving radial sidewall portions of a substantially cylindrical element for pressing said sheath, said radial sidewall portions being maintained in interleaving engagement by toothed elements provided on said clamping jaws and which are adapted to maintain at least partial interleaving engagement of said radial sidewall portions when said clamping jaws are in said expanded position, said second set of clamping jaws having inclined sliding surfaces which are coupled to corresponding shaped sliding surfaces provided on said two support members for movement between expanded and contracted positions, in synchronism with that of said first set, and in response to the said relative movement of said other support member, means for controlling the relative movement of the clamping jaws of said second set, and means for controlling the relative movement of said other support member and hence, of said jaws.

2. Apparatus for crimping a tubular metallic sheath of an electric cable to a rigid closure member, said apparatus comprising a plurality of interleaving clamping jaws, each having a curved surface corresponding to one radial sectoral portion of said tubular metallic sheath, means mounting said clamping jaws with their respective curved surfaces adjacent one another to define a radial clamping element for pressing said sheath, and means for moving said clamping jaws to expanded and contracted positions relative to one another, said clamping jaws being retained in interleaving engagement by toothed elements provided on each and which are adapted to maintain at least partial interleaving engagement of said clamping jaws when said clamping jaws are moved to said expanded position, said toothed elements of said clamping jaws being lateral extensions of said curved surface and being curved for one part of their lateral development and substantially straight for the remaining length so as to prevent the pinching of the sheath when the jaws move to the contracted position.

3. The apparatus as in claim 1 wherein the toothed elements of said clamping jaws are lateral extensions of said mutually facing surfaces, and are curved for a length equal to substantially one half of their lateral development to define lateral extensions of said radial sidewalls portions of said cylindrical element for pressing said sheath and are substantially straight for the remaining length so as to prevent the pinching of the sheath when the jaws move to the contracted position.

4. The apparatus as in claim 1 wherein the means for controlling the relative position of the clamping jaws of said one set includes a fluid controlled piston, and the means for controlling the relative movement of the clamping jaws of said additional set includes spring means connected to said frame.

5. Apparatus as in claim 2 wherein the means for moving said clamping jaws includes a fluid controlled piston.

References Cited

UNITED STATES PATENTS

| | | | |
|---|---|---|---|
| 1,761,887 | 6/1930 | Junkers | 72—395 |
| 1,809,168 | 6/1931 | Junkers | 72—395 |
| 3,109,333 | 11/1963 | Anderson | 72—402 |
| 3,154,978 | 11/1964 | Baker | 72—402 |

CHARLES W. LANHAM, Primary Examiner

G. P. CROSBY, Assistant Examiner

U.S. Cl. X.R.

72—452